United States Patent [19]

Otsuki

[11] Patent Number: 5,156,869

[45] Date of Patent: Oct. 20, 1992

[54] METHOD AND APPARATUS FOR PROCESSING FOODS

[76] Inventor: Tatsukiyo Otsuki, 9-25, Saiwaicho, Okayama, Japan

[21] Appl. No.: 724,590

[22] Filed: Jul. 1, 1991

[30] Foreign Application Priority Data

Oct. 31, 1990 [JP] Japan ................... 2-294886

[51] Int. Cl.$^5$ ..................... A23L 1/00; H05B 6/00
[52] U.S. Cl. ..................... 426/237; 99/451; 99/DIG. 14; 426/244
[58] Field of Search ............... 426/237, 244; 99/451, 99/DIG. 14

[56] References Cited

U.S. PATENT DOCUMENTS

| | | | |
|---|---|---|---|
| 2,848,400 | 8/1958 | Meier et al. | 426/237 |
| 3,573,067 | 3/1971 | Shults | 426/234 |
| 4,343,979 | 8/1982 | Barbini et al. | 99/451 |
| 5,034,236 | 7/1991 | Ohtsuki | 426/244 |

FOREIGN PATENT DOCUMENTS

| | | |
|---|---|---|
| 409430 | 1/1991 | European Pat. Off. . |
| 982441 | 6/1951 | France . |
| 991697 | 10/1951 | France . |
| 2230152 | 12/1974 | France . |
| 55-42805 | 11/1980 | Japan . |
| 2-257867 | 10/1990 | Japan . |
| 139100 | 2/1920 | United Kingdom . |

*Primary Examiner*—George Yeung
*Attorney, Agent, or Firm*—Leydig, Voit & Mayer

[57] ABSTRACT

An apparatus for processing food which includes an insulated container having a conductive lining. A negative electron generator is coupled to the conductive lining for transmitting negative electrons to the lining thus creating a condition of high humidity inside the container.

7 Claims, 2 Drawing Sheets

FIG. I

METHOD AND APPARATUS FOR PROCESSING FOODS

FIELD OF THE INVENTION

The present invention relates to a process for thawing, maturing and fermenting a frozen dough for preparing bread and an apparatus therefor.

DESCRIPTIONS OF THE PRIOR ART

In general, in the production of foodstuffs, particularly in the thawing, maturing and fermenting of frozen dough, it is important to maintain humidity in a container for a foodstuff, i.e., a thawing, maturing or fermenting container should be maintained at an appropriate level.

In order to keep the humidity at a certain level, there has hitherto been conducted a compulsive moistening method by using a humidifier of an automatic water supply type equipped with an electric heater (Japanese Patent Publication No. 42805/1980). In this case, the water molecules have large molecular masses (clusters).

On the other hand, the present Applicant's Japanese Patent Application Kokai (Laid-Open) NO. 168833/1989 discloses that water having small clusters, natural water, has a flavorable offset on the freshness-retaining, maturing and water holding capacities of foodstuffs.

There has hitherto been reported, however, nothing about the production of bread by maintaining the humidity in a thawing, maturation or fermentation container at a certain level by using a negative electron generator according to the electrostatic induction method.

When the frozen dough was thawed under an atmospheric condition or under a heating condition, the foodstuffs dried rapidly and thus had to be fermented and baked soon after thaw in order to obtain delicious breads. Therefore, when a conventional fermentor is used, it is necessary to remove frozen dough from a refrigerator and transfer it directly into the fermentor, so that bread-manufacturers were compelled to work early in the morning. In this regard, an apparatus having both functions of freezing and fermentation such as a dough conditioner is often used, but even in such an apparatus thawing is conducted by heat exchanging and proceeds gradually from the surface of a dough into the inner part, so that homogeneous thawing cannot be conducted. Furthermore, the apparatus uses a compulsive humidifying method, and, thus, it is impossible to produce voluminous and tall breads or breads having a low fat content by using such frozen dough.

Heretofore, low fat foods having low stability upon freezing and thawing such as so-called traditional breads which were produced from yeast and wheat flour, for example, French breads, German breads or the like, could not be produced from a frozen dough using the conventional methods.

When sweet baked goods such as goods containing a bean-jam or a cream are compulsively humidified, sticky or clammy feelings will not disappear from the surface of the finished goods. Moreover, the goods exhibit a low bonding power with moisture which causes moisture to be lost from the goods, resulting in a degradation in quality.

Voluminous and tall breads such as a "double soft" type bread are baked under relatively lower temperature and are very soft and full. Glucose is used instead of sucrose as a sweetener. However, these breads are produced only by the addition of a considerable amount of sugar, and it is desired to have a bread having a low sugar content for reason of health.

1. negative electron generator by electrostatic induction (high voltage transformer),
2. refrigerator,
3. fan for compulsive circulation,
4. heater,
5. conductive part,
6. insulating part,
7. circulation hood,
8. frozen dough or uncooked dough,
9. stainless steel shelf,
10. thawing, maturation and fermentation container.

Figure 1:
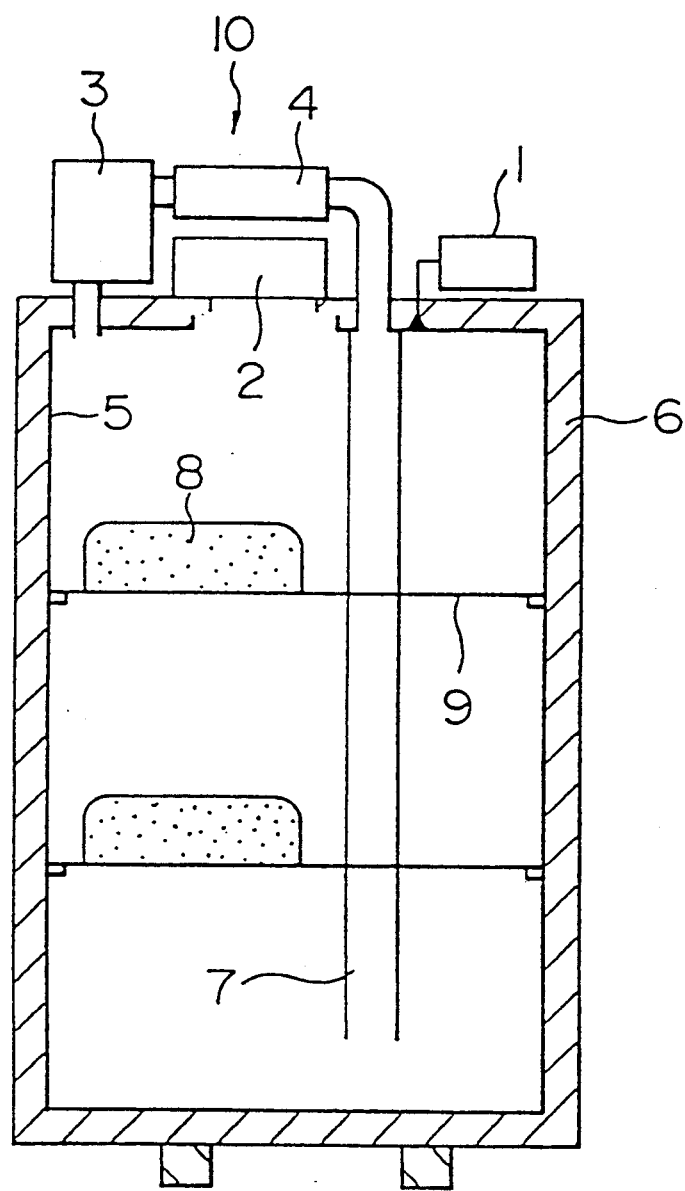
FIG. 1 is a schematic illustration of a thawing, maturation and fermentation container as one example of the present invention.
Figure 2:
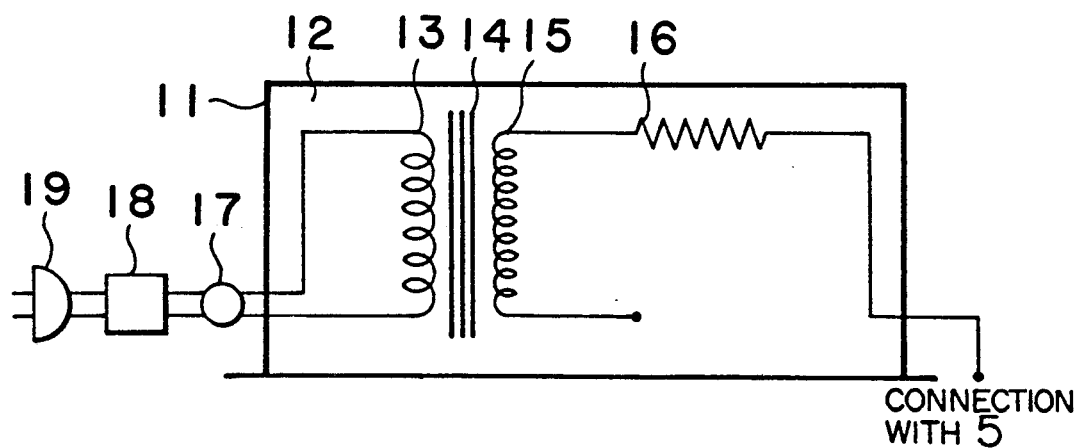

FIG. 2 is a detailed diagram of negative electron generator 1 by electrostatic induction (high voltage transformer) corresponding to FIG. 1.

11. insulating outer case
12. insulating resin
13. primary coil (lower voltage side)
14. core
15. secondary coil (higher voltage side)
16. output resistors
17. pilot lamp
18. circuit breaker
19. plug

SUMMARY OF THE INVENTION

In order to solve the aforementioned problems, the present invention provides a thawing, maturation and fermentation container, in which the inside of the container is insulated, a conductive number is provided in the container, and said conductive member is connected to an end of a negative electron generator through a conductor. The present invention preferably provides a thawing, maturation and fermentation container equipped with a refrigerator, a heater and a fan.

The present invention also provides a process for producing foodstuffs by applying negative electrons to the foodstuffs within the container with use of the negative electron generator connected to the conductive member within the container.

The present invention preferably provides a process wherein the treated foodstuffs are breads.

The thawing, maturation and fermentation container and the process of the present invention are described in detail below with reference to FIG. 1.

The inside of the thawing, maturation and fermentation container of the present invention is electrically insulated by insulator 6. The container itself is also insulated electrically from the earth. A shelf 9 made of an electroconductive material, preferably an iron or stainless steel plate, is provided within the container. A negative electron generator 1 is provided outside the container. The foodstuffs are placed within the container and for example, breads are placed on the shelf. A refrigerator 2, a heater 4 and a fan 3 may be provided outside the container. In this case, these parts are insulated from earth.

The negative electron generator 1 is, for example, a high voltage inductive transformer, in which an electrode at the secondary high voltage side is insulated and another electrode is connected to the inside of the container such as the shelf 9 made of an electroconductive metal through a conductor.

According to the process and the apparatus of the present invention, a high voltage in the range of 10,000 V–15,000 V is applied to the inside of the container. The operation can be thus conducted at a temperature of −3° C. in a food production process such as a thawing process. In the conventional method, such operation was conducted at a temperature above 0° C.

The inside of the container of the apparatus according to the present invention is maintained at a humidity of 85% or more by the activity of negative electrons generated by the high voltage electrostatic induction method. In general, the thaw, maturation and fermentation of a dough should be conducted by maintaining the humidity at 85% or more to maintain the freshness of the food. According to the present process and the apparatus thereof, a humidifier which was essential to the conventional apparatus is not required, because the inside of the container can be maintained at a humidity of 85% or more by the activity of the negative electrons.

Negative electrons applied to the inside of the container and the food with the negative electron generator.

The negative electron generating condition in the present invention is most effective when the primary voltage is about 100 V and the primary current ranges between 0.02 A–0.3 A per 1 $m^2$ of the area of the electrode. The secondary voltage for satisfying the primary voltage being required to be in the design range of 5,000 V–20,000 V. The negative electron generating condition is controlled by the primary current. However, if the primary current is less than 0.02 A, the advantageous effect of the present invention is diminished. If the primary current is above 0.3 A, the effect is not increased so much.

According to the present process and the apparatus thereof, each thawing, maturation and fermentation process can be conducted continuously with use of a timer, because thawing can be conducted at −3° C. according to the process of the present invention and foodstuffs can be stored for a long time. The process of the present invention provides suppression of the growth of a microorganisms such as baker's yeast, so that it is not always required to proceed directly to maturation and fermentation processes.

A method of generating negative electrons by electrostatic induction in the present invention is described in detail with reference to FIG. 2. This method of generating negative electrons forms a field of high voltage, namely high electric potential without running current. A high voltage electrostatic transformer (1) is used to generate the high voltage field. Single-phase alternating current 100 V, frequency 50 or 60 Hz are employed at the primary side (lower voltage side). The diameter of wire of the primary coil (13) is preferably 0.2 to 1.0 mm. The current value of the primary coil is ordinarily designed to regulate 0.02 to 0.3 A. The current value of this primary side is mostly based on the number of wire turns of the primary coil and the density of magnetic flux of the core.

The ratio of the number of the wire turns between the primary side and the secondary side is regulated so that 5000 to 20000 V may be obtained at the secondary side (higher voltage side). In this case, the wire diameter of the secondary coil (15) is preferably 0.04 to 0.09 mm.

Then, insulation of one electrode at the secondary side results in formation of only voltage and inhibition of running of electrical current, thereby the field of high potential may be made.

Next, another electrode is connected with the outer case (5). In this case, the conductive portion of the case (5) must be completely insulated from all and ground. Where a portion is grounded with other objects, the design should be achieved so that electrical current is not run by action of the output resistor having high resistance.

The insulating case (11) and the insulating resin (12) protect the high voltage transformer and insulate the transformer and additionally insulate one electrode at the secondary side (high voltage side).

Pilot lamp (17) is an operating lamp and circuit breaker (18) is a safety breaker.

While the process of the present invention exhibits the water-retention of foods on its use for only the fermentation process, the water-retention of foods can be promoted when using the process of the present invention for the thawing and maturation processes. The process of the present invention has been described mainly referring to the production of breads, and it will be understood to a person skilled in the art that the process of the present invention can be applied to any foods which require thawing, maturation and fermentation processes.

It is evident from the foregoing that the application of a high voltage (10,000–15,000 V) to the inside of the container results in a variety of advantageous effects such as 1) freshness-maintenance (particularly effective for protein and fat);
2) possibility of thawing at a temperature of −3° C.; and
3) water holding capacity (the inside of the container can be maintained at a humidity of 85% or more, and the moisture is natural water, that is, of small clusters, so that it is brisk in motion, binds to food components strongly and is hardly vaporized).

The present invention is illustrated by an example, but the present invention is not limited thereto.

EXAMPLE AND COMPARATIVE EXAMPLE

Apparatus of the invention

The apparatus of the instant invention is manufactured by SANTETSU K.K. It includes a heater having a capacity of 0.5 KW and a freezer having a capacity of 0.15 KW. The external size is 960×750×1880 mm. FIG. 1 is a schematic illustration of a thawing, maturation and fermentation container 10 as an embodiment of the present invention, in which the inside of the container is completely insulated from external circumstances. A high voltage inductive transformer 1 is provided on the upper part of the container, and an electrode at the secondary high voltage side is connected to the inside of the container to ensure that negative electrons can be applied. The inside of the container and the shelf 9 are connected and are in electrical communication with each other.

Conventional apparatus

In the comparative examples, a dough conditioner as a conventional apparatus A was used which is equipped with a heater having a capacity of 2.7 KW and a freezer having a capacity of ¾HP. Its external size is 900×1000×2330 mm. A fermentator was used as a conventional apparatus B equipped with a heater having a capacity of 1 KW and having an external size of 770×975×22000 mm. Breads were then produced with use of the apparatus of the present invention and the conventional apparatuses A and B.

Evaluation was conducted, as shown below, by a four-grade evaluation method as an empirical evaluation.

⊚ very good,
○ good,
△ medium,
x inferior.

|  | Thawed dough | | Product bread | | | | | Combined evaluation |
|---|---|---|---|---|---|---|---|---|
|  | Handling ability | Extensibility | Appearance | Body | Color | Texture | Shelf stability | |
| Production of sweet baked goods containing bean-jam bun | | | | | | | | |
| The present invention | ⊚ | ⊚ | ⊚ | ⊚ | ⊚ | ⊚ | ⊚ | ⊚ |
| Conventional method A | ○ | △ | △ | △ | △ | △ | X | △ |
| Conventional method B | ○ | △ | △ | △ | △ | △ | X | △ |
| Production of bread | | | | | | | | |
| The present invention | ⊚ | ⊚ | ⊚ | ⊚ | ⊚ | ⊚ | ⊚ | ⊚ |
| Conventional method A | △ | △ | △ | △ | △ | △ | X | X |
| Conventional method B | △ | X | △ | △ | △ | △ | X | △ |
| Production of double soft bread | | | | | | | | |
| The present invention | ⊚ | ○ | ⊚ | ⊚ | ⊚ | ⊚ | ⊚ | ⊚ |
| Conventional method A | △ | △ | △ | △ | X | X | X | X |
| Conventional method B | △ | X | △ | △ | X | X | X | X |

Thawing condition

Thawing conditions were as follows:

|  | Temperature °C. | Humidity % | Thawing time hour |
|---|---|---|---|
| Apparatus of the present invention | −3 | 90 | 6 |
| Conventional apparatus A | +3 | 85 | 6 |
| Conventional apparatus B | 20 | 60 | 2 |

Fermentation condition

Fermentation conditions were as follows:

|  | Temperature °C. | Humidity % | Fermentation time hour |
|---|---|---|---|
| Apparatus of the present invention | 37 | 90 | 40 |
| Conventional apparatus A | 32 | 85 | 60 |
| Conventional apparatus B | 32 | 85 | 60 |

Results are shown blow.

Thawed doughs were evaluated on the points of handling ability and extensibility, and finished breads were evaluated on the points of appearance, body, color, texture and shelf stability as well as the combined judgment.

What is claimed is:

1. A method of processing foods comprising the steps of:
   placing a selected food in an insulated container on a conductive sheet;
   maintaining the temperature inside the insulated container at a constant preselected temperature;
   generating electric potential in the range of 10,000 to 15,000 volts across the secondary coil of a transformer by applying current in the range of 0.02 to 0.3 amperes to the primary coils of the transformer; and
   applying said generated potential to the conductive sheet so that the humidity in the insulated container is maintained at a rate of at least 85%.

2. A method of processing foods according to claim 1 wherein the preselected temperature is below 0° C.

3. A method of processing foods according to claim 1 wherein the preselected temperature is −3° C.

4. A container for foods comprising:
   an insulated inside surface; and
   a conductive lining tracing said insulated inside surface;
   a plurality of conductive shelves electrically connected to said conductive lining; and
   a transformer which generates voltage in the range of 5,000 volts to 20,000 volts, electrically connected to said conductive lining.

5. A container according to claim 4, wherein said container is further provided with a refrigerator, a heater and a fan.

6. A container for foods according to claim 4 wherein the conductive lining comprises an open circuit.

7. A container for foods comprising:
   an insulated inside surface; and
   a conductive lining tracing said insulated inside surface; and a transformer connected to said conductive lining including:

an insulating case, a primary coil having a first predetermined number of turns and a secondary coil having a second predetermined number of turns where the ratio of turns between the primary and secondary coil is regulated so that the voltage across the secondary coil is between 5,000 volts and 20,000 volts, insulating resin disposed within the insulating case, a first electrode extending from the secondary coil which is insulated by the insulating resin, a second electrode extending from the secondary coil and connected to said conductive lining.

* * * * *